United States Patent
Kornrumpf et al.

(10) Patent No.: US 6,818,466 B2
(45) Date of Patent: Nov. 16, 2004

(54) METHOD OF FABRICATING AN INTEGRATED OPTOELECTRONIC CIRCUIT

(75) Inventors: William Kornrumpf, Schenectady, NY (US); Glenn Claydon, Wynantskill, NY (US); Samhita Dasgupta, Niskayuna, NY (US); Robert Filkins, Niskayuna, NY (US); Glenn Forman, Niskayuna, NY (US); Joseph Iannotti, Glenville, NY (US); Matthew Christian Nielsen, Schenectady, NY (US)

(73) Assignee: General Electric Company, Schenectady, NY (US)

(*) Notice: Subject to any disclaimer, the term of this patent is extended or adjusted under 35 U.S.C. 154(b) by 7 days.

(21) Appl. No.: 10/728,148

(22) Filed: Dec. 4, 2003

(65) Prior Publication Data

US 2004/0120626 A1 Jun. 24, 2004

Related U.S. Application Data

(62) Division of application No. 10/248,148, filed on Dec. 20, 2002, now Pat. No. 6,711,312.

(51) Int. Cl.$^7$ .............................................. H01L 21/00
(52) U.S. Cl. .............................. 438/31; 438/29; 438/99; 438/107
(58) Field of Search ............................... 438/21–32, 99, 438/98, 106, 107, 455–459, 629, 637–639

(56) References Cited

U.S. PATENT DOCUMENTS

| | | | |
|---|---|---|---|
| 4,783,695 A | 11/1988 | Eichelberger et al. | |
| 5,125,054 A | * 6/1992 | Ackley et al. | 385/49 |
| 5,265,184 A | * 11/1993 | Lebby et al. | 385/132 |
| 5,497,033 A | 3/1996 | Fillion et al. | |
| 5,525,190 A | 6/1996 | Wojnarowski et al. | |
| 5,527,741 A | 6/1996 | Cole et al. | |
| 5,548,099 A | 8/1996 | Cole, Jr. et al. | |
| 5,737,458 A | 4/1998 | Wojnarowski et al. | |
| 5,862,276 A | * 1/1999 | Karras | 385/30 |
| 5,888,884 A | 3/1999 | Wojnarowski | |
| 5,991,491 A | * 11/1999 | Madabhushi | 385/131 |
| 6,272,271 B1 | 8/2001 | Wojnarowski et al. | |
| 6,421,472 B1 | 7/2002 | Moroni et al. | |
| 6,432,741 B1 | 8/2002 | Mueller et al. | |
| 6,522,793 B1 | * 2/2003 | Szilagyi et al. | 385/2 |
| 6,587,605 B2 | 7/2003 | Paniccia et al. | |
| 2001/0041025 A1 | 11/2001 | Farahi | |
| 2002/0181882 A1 | 12/2002 | Hibbs-brenner et al. | |
| 2003/0231819 A1 | * 12/2003 | Palmer et al. | 385/14 |

FOREIGN PATENT DOCUMENTS

JP          06281831       * 7/1994

OTHER PUBLICATIONS

Oh, et al., Recent Advances in Electrooptic Polymer Modulators Incorporating Highly Nonlinear Chromophore, Sep./Oct. 2001, vol. 7, No. 5.

* cited by examiner

*Primary Examiner*—Savitri Mulpuri
(74) *Attorney, Agent, or Firm*—Cantor Colburn LLP

(57) ABSTRACT

A method of fabricating an integrated optoelectronic circuit. The method includes positioning a microchip on a first flexible dielectric substrate. A polymer electro-optic waveguide is positioned on or within the first flexible dielectric substrate. A ground electrode is positioned along the electro-optic waveguide. A signal electrode is positioned along the electro-optic waveguide opposite the ground electrode. A first patterned metallization layer is applied to the first flexible dielectric substrate. A second flexible dielectric substrate is positioned along the first flexible dielectric substrate. A plurality of via openings are provided in the first and second flexible dielectric substrates. A second patterned metallization layer is applied to the second flexible dielectric substrate.

12 Claims, 14 Drawing Sheets

METHOD OF FABRICATING AN INTEGRATED OPTOELECTRONIC CIRCUIT

CROSS-REFERENCE TO RELATED APPLICATIONS

This application is a divisional of U.S. patent application Ser. No. 10/248,148, filed Dec. 20, 2002, now U.S. Pat. No. 6,711,312, the entire contents of which are incorporated herein by reference.

BACKGROUND OF THE INVENTION

This disclosure relates to an optoelectronic circuit and more specifically to a combination of microwave and photonic components for a compact, self contained Mach-Zehnder interferometer (MZI) modulator.

Modulation of an optical signal at microwave frequencies, typically above 10 GHz, requires external modulation of a laser source to prevent unintentional modulation of the laser frequency (e.g. chirping). Towards this end, a Mach-Zehnder interferometer structure is often employed to create an optical phase and/or amplitude modulator. One or both arms of the Mach-Zehnder interferometer contains electrodes to permit phase modulation of an optical signal via the electro-optic effect. These electrodes require a drive amplifier to supply adequate electric field to produce the electro-optic effect. The amplifier requires sufficient bandwidth and output capability to drive the reactive load presented by the Mach-Zehnder electrodes.

Early electro-optic (EO) modulators required a large external power amplifier to provide hundreds of volts to produce the electro-optic effect. Recent devices have the modest drive requirement of 8–12 volts, but still require an external RF power amplifier to operate. Advances in polymer technology have allowed for the development of materials with large EO figures of merit, resulting in low $V_\pi$ numbers.

BRIEF DESCRIPTION OF THE INVENTION

An embodiment of the invention is a method of fabricating an integrated optoelectronic circuit. The method includes positioning a microchip on a first flexible dielectric substrate. A polymer electro-optic waveguide is positioned on or within the first flexible dielectric substrate. A ground electrode is positioned along the electro-optic waveguide. A signal electrode is positioned along the electro-optic waveguide opposite the ground electrode. A first patterned metallization layer is applied to the first flexible dielectric substrate. A second flexible dielectric substrate is positioned along the first flexible dielectric substrate. A plurality of via openings are provided in the first and second flexible dielectric substrates. A second patterned metallization layer is applied to the second flexible dielectric substrate.

DETAILED DESCRIPTION OF THE INVENTION

Figure 1:
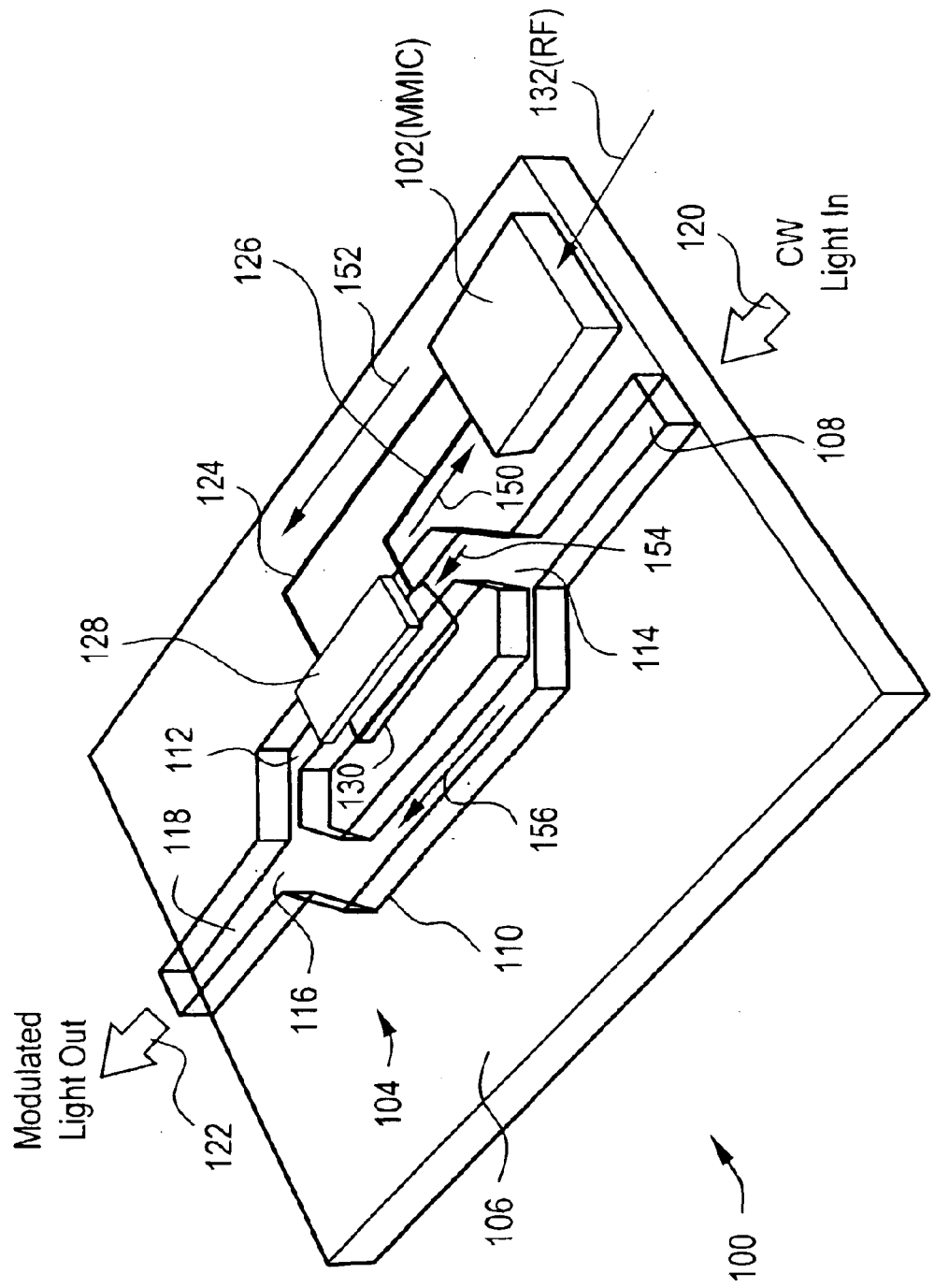
FIG. 1 is a schematic diagram of an integrated optoelectronic circuit for modulating an optical signal.

Referring to FIG. 1, an integrated optoelectronic circuit is shown generally at 100. The optoelectronic circuit 100 comprises an electro-optic device, such as a Mach-Zehnder (MZI) 104 or an electro-absorptive modulator receptive of an optical signal 120. A monolithic microwave integrated circuit (MMIC) 102 is coupled to a polymer based MZI 104 by way of a pair of electrodes 128, 130 and an output transmission line 124 and a ground signal return transmission line 126. These transmission lines are in the nature of microstrip transmission lines. Electrode 130 is a ground electrode and electrode 128 is a radio frequency (RF), or signal, electrode (e.g., a microstrip transmission line). The MMIC 102 is receptive of a radio frequency modulating signal 132 for modulating the optical signal 120 in the MZI 104 providing thereby as output a modulated optical signal 122. Examples of suitable organic materials in the MZI include poly(acrylates); poly(alkyl methacrylates), for example poly(methyl methacrylate) (PMMA); poly (tetrafluoroethylene) (PTFE); silicones; and mixtures comprising at least one of the foregoing organic materials, wherein the alkyl groups have from one to about twelve carbon atoms.

The MZI 104 comprises an input channel 108 receptive of the optical signal 120. A beam splitter 114 splits the optical signal 120 into two beams 154, 156 and directs them separately along a first branch 110 and a second branch 112. In the embodiment of FIG. 1, the electrodes 128, 130 are positioned diametrically opposed to one another across one of the branches of the MZI 104. Alternatively, a plurality of ground electrodes 130 may be separately positioned along the first branch 110 and second branch 112 with electrode 128 positioned between and along the first branch 110 and the second branch 112 (FIGS. 4–8).

Polymers are usually centrosymmetric in nature and thus do not display the electro-optic effect. However, polymers may be made to display the electro-optic effect by poling of highly optically nonlinear chromophores/molecules, which can be incorporated into a polymer host. Thus, the optical signals 154, 156 in a polymer based MZI 104 are modulated by the RF modulating signal 132, 152 by way of the MMIC 102, the transmission lines 124, 126 and electrodes 128, 130. The optical signals 154, 156 are combined at a beam combiner 116, thus providing as output a modulated output signal 122 at exit channel 118.

Figure 2:
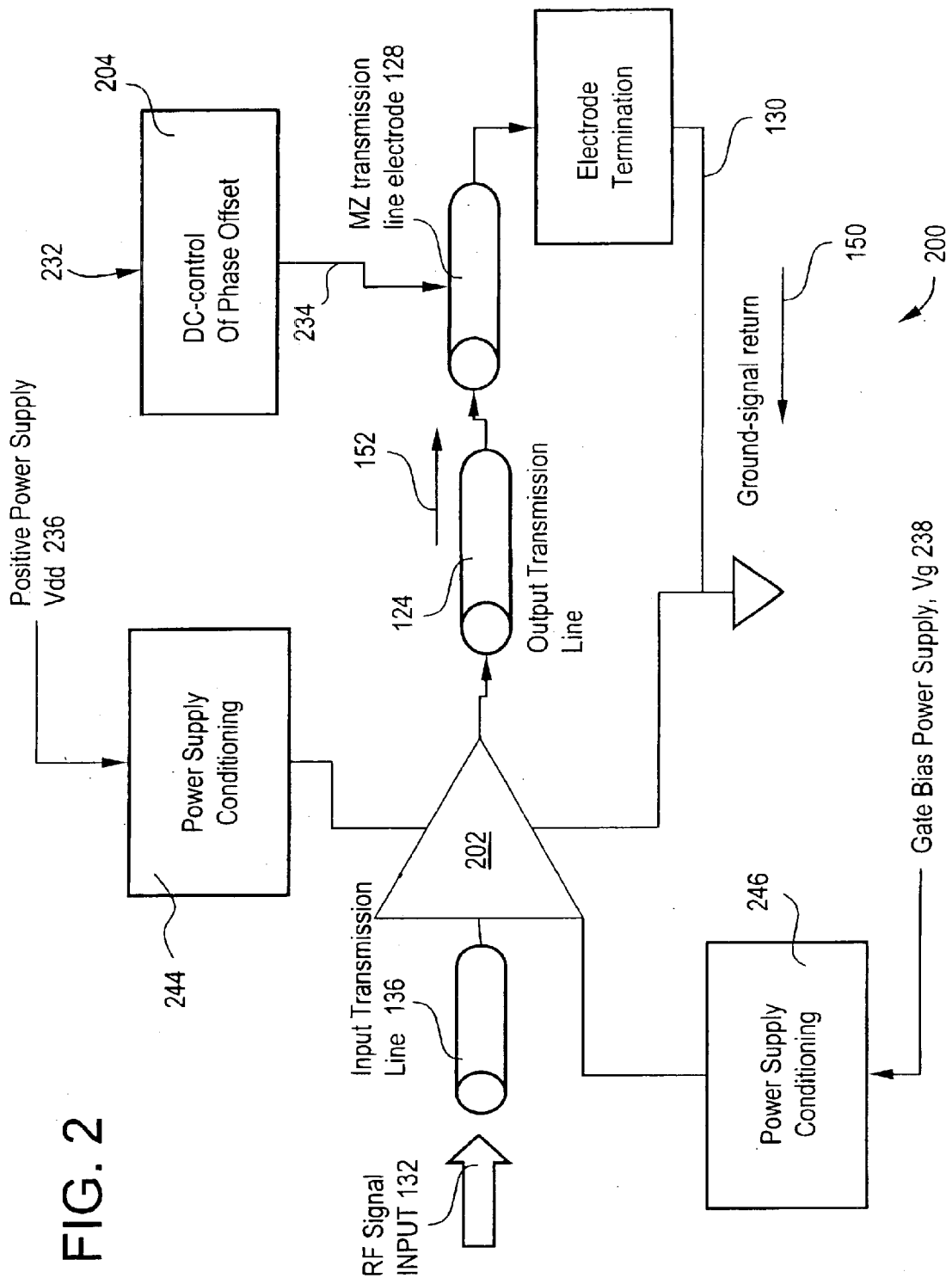
FIG. 2 is a schematic diagram of an RF power amplifier and phase control circuit for the integrated optoelectronic circuit of FIG. 1.

In FIG. 2, the MMIC 102 comprises an RF power amplifier 202 receptive of the RF modulating signal 132. The MMIC 102 is coupled to the electrodes 128, 130 by way of the transmission lines 124, 126. A phase offset circuit 204 receptive of a phase offset signal 232 is connected to the MZI 104 at 234 and provides control of the static phase offset of the optical signals 154, 156 in the MZI 104.

Figure 3:
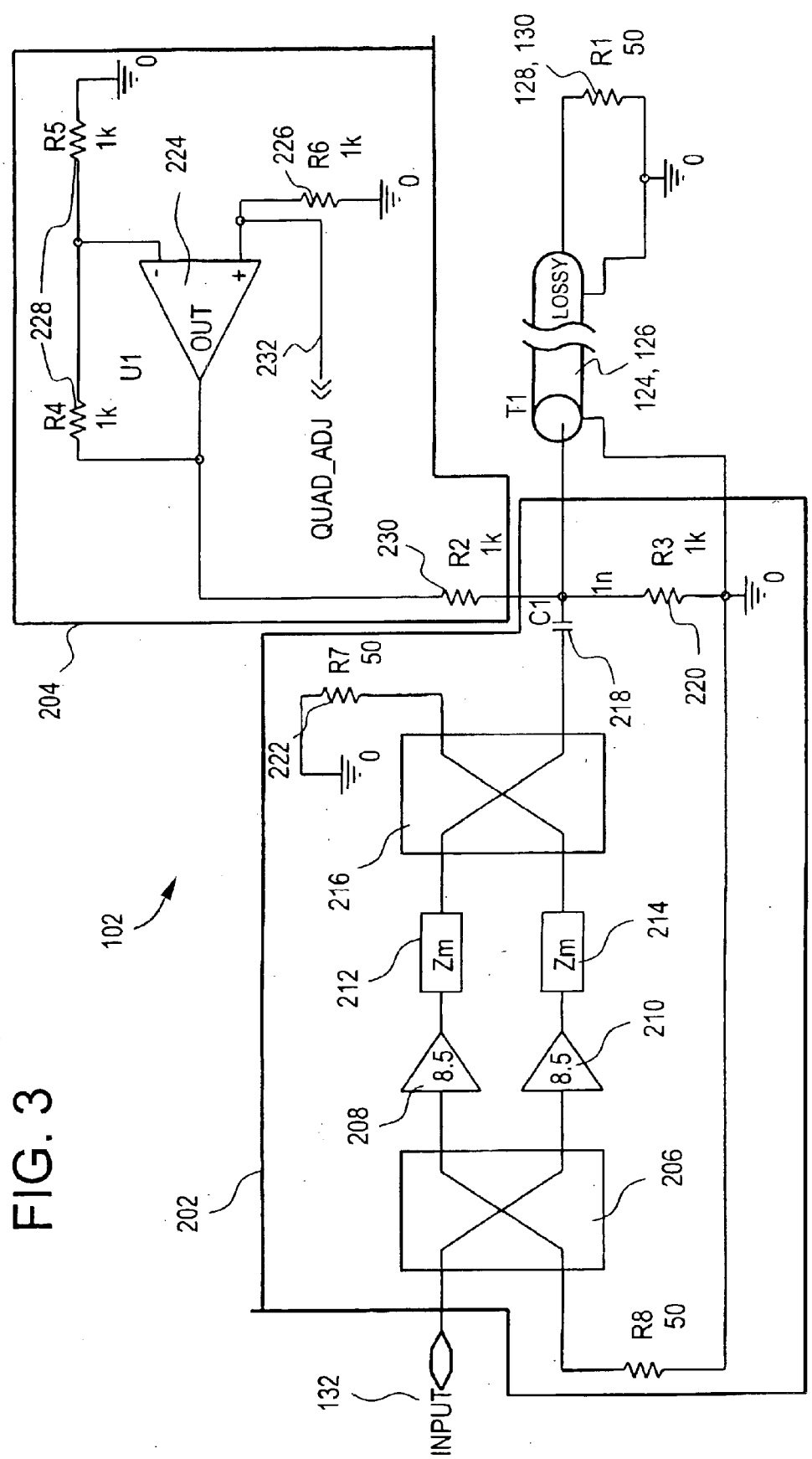
FIG. 3 is a schematic diagram of an electric circuit for the RF power amplifier and phase control circuit of FIG. 2.

In FIG. 3, the RF power amplifier 202 comprises a power divider 206 receptive of the modulating signal 132 at a first input thereto. A pair of amplifiers 208 are receptive of the power divided signal and are impedance matched 212, 214 to a power combiner 216. The power combiner 216 provides an amplified modulating signal 152 to the electrodes 128, 130 by way of transmission line 124. Continuing in FIG. 3, the phase offset circuit 204 comprises an opamp 224 circuit in noninverting configuration receptive of a DC bias 232 for setting the phase offset of the MZI 104.

Figure 4:
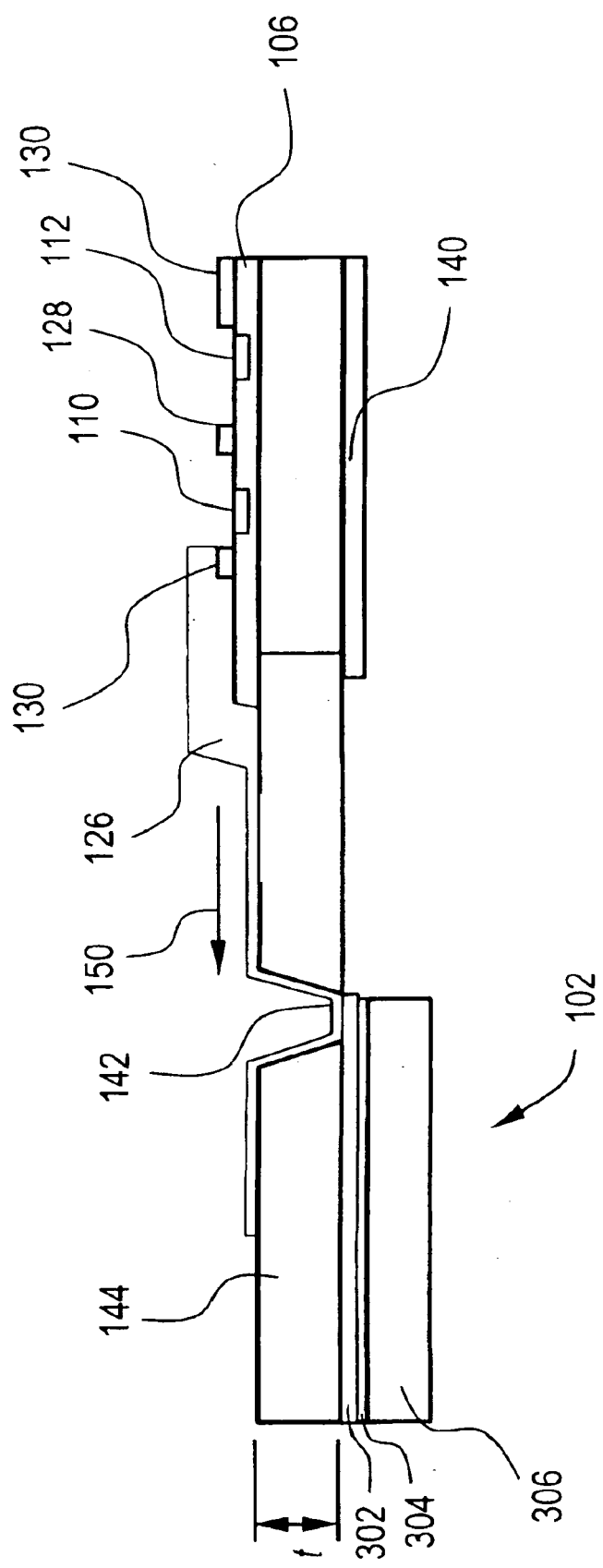
FIG. 4 is a sectional side view of a portion of an integrated optoelectronic circuit including a monolithic microwave integrated circuit (MMIC) and a Mach-Zehnder interferometer (MZI) on a flexible dielectric substrate.

Referring to FIG. 4, a cross section of an embodiment of the optoelectronic circuit 100 is shown. The MMIC 102 is positioned on a first side of a flexible dielectric substrate 144. The flexible dielectric substrate 144 is approximately 1 to 2 mils thick and may comprise for example a polyamide polymer such as KAPTON®. The MMIC 102 is mounted directly to the flexible dielectric substrate 144 using a die mount carrier (306 in FIG. 10E). The MZI 104 is positioned on a second side of the flexible dielectric substrate 144 opposite the side of the MMIC 102 or may be directly embedded in the flexible dielectric substrate 144. Transmission line 126, carrying ground return signal 150 from the MZI 104, is positioned on the flexible dielectric substrate 144 and connected to ground electrode 130 opposite the MMIC 102. Circuit connection (via hole) 142 is made between the MMIC 102 and ground electrode 130 of the MZI 104 by way of signal transmission line 126.

Figure 5:
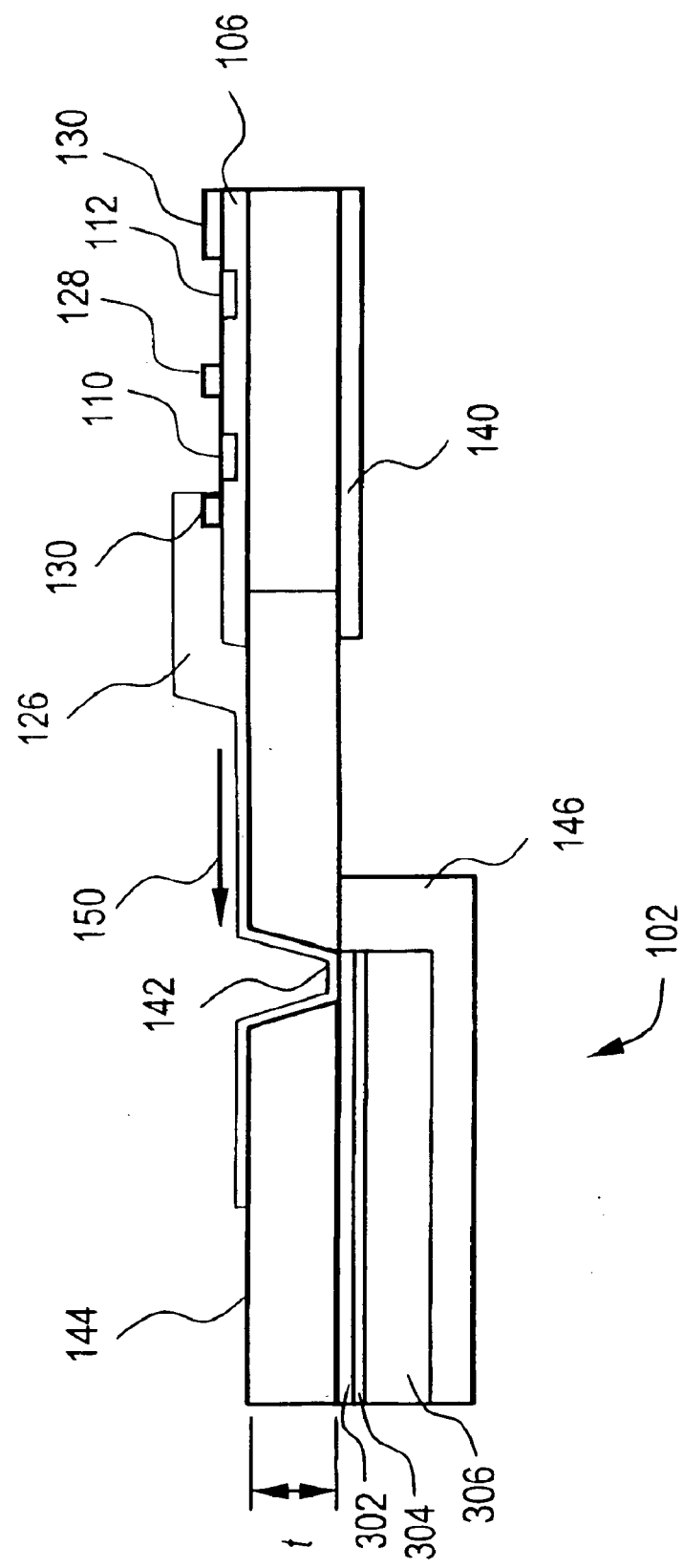
FIG. 5 is a sectional side view of the integrated optoelectronic circuit of FIG. 4 including a microwave absorber and heat exchanger.

A poling electrode 140 is positioned on the flexible dielectric substrate 144 opposite the MZI 104. Poling electrode 140, is positioned on the same side of the flexible dielectric substrate 144 as the MMIC 102 and is substantially removed from the area near and around the MMIC 102 to prevent stray microwave signals from coupling to the poling electrode 140. The die mount 306 and the bonding layer 304 may be removed and the MZI 104 and the MMIC 102 prepared for further processing. The die mount 306 and the bonding layer 304 are removed if the finished module is to be attached to another circuit assembly, which may then provide the same function as the die mount 306. Otherwise the heat exchanger is required. Alternatively, the die mount 306 and the bonding layer 304 may be retained and used as a heat exchanger, such as a thermoelectric cooler, to control the temperature of the MMIC 102. In FIG. 5, the MMIC 102 may also be encased or encapsulated within a microwave absorbing plastic 146 such as a ferrite doped plastic or paint to reduce interference effects from extraneous microwave signals.

Figure 6:
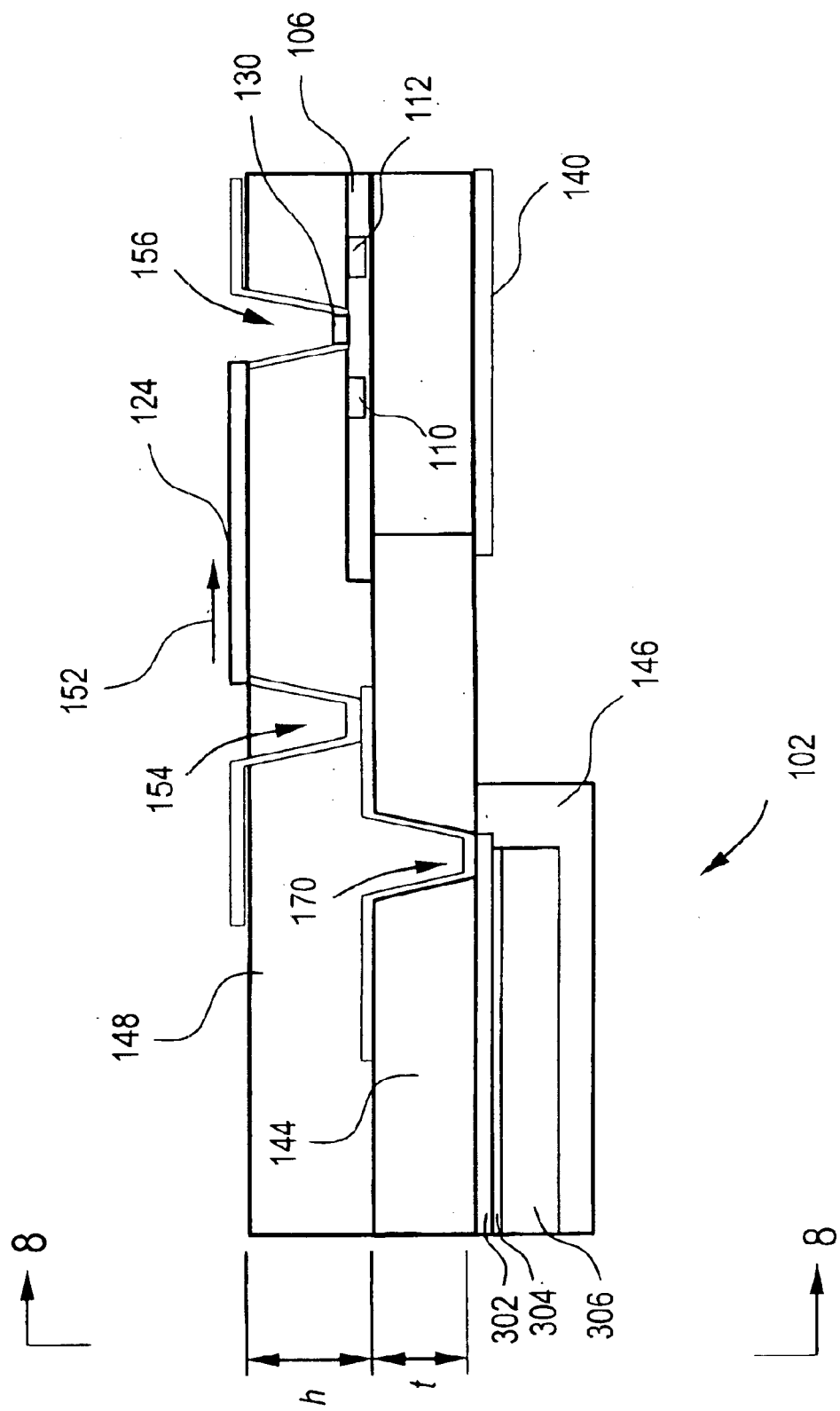
FIG. 6 is a sectional side view of the integrated optoelectronic circuit of FIGS. 4 and 5 including a flexible interelectrode dielectric substrate and showing electrical interconnections for the modulating signal between the MMIC and the MZI.

Referring to FIG. 6, a second flexible dielectric substrate 148 is positioned above the first flexible dielectric substrate 144 to serve as an inter-electrode dielectric for the transmission lines 124, 126. The interconnection for DC bias 234 (FIG. 9) and landing pads 248 (FIG. 9) for passive devices 240 (FIG. 9) are made. The input transmission line 136 and the output transmission line 124 in FIGS. 4–8, which couple the RF modulating signal 132 to the MMIC 102, and from the MMIC 102 to the MZI 104, are fabricated with specific geometries so as to achieve an appropriate characteristic impedance, $Z_o$. The dimensions h and t in FIGS. 4–7 are approximately 38 micrometers and the width of transmission lines 124, 126, 128 170 are adjusted to provide a 50 ohm transmission line. The width to height (h, t) is based upon the value of 3.4 for the relative dielectric constant of KAPTON®. The characteristic impedances, $Z_o$, and therefore the exact geometries of transmission lines 124, 126, 128, 136 are matched (i.e., impedance matched) to the MZI 104 by mathematical modeling, computer simulation and empirical data to optimize the arrangement of the transmission lines 124, 126, 128, 136 and performance of the optoelectronic circuit over the operating frequency of the MMIC 102 (1 MHz–50 GHz). One set of performance measurements analyzed is the microwave scattering parameters $s_{11}$, $s_{12}$, $s_{21}$, $s_{22}$. Transmission line interconnects are directly fabricated on the flexible dielectric substrates 144, 148 to provide exact impedances and thus a MMIC 102 impedance matched to the MZI 104.

Figure 7:
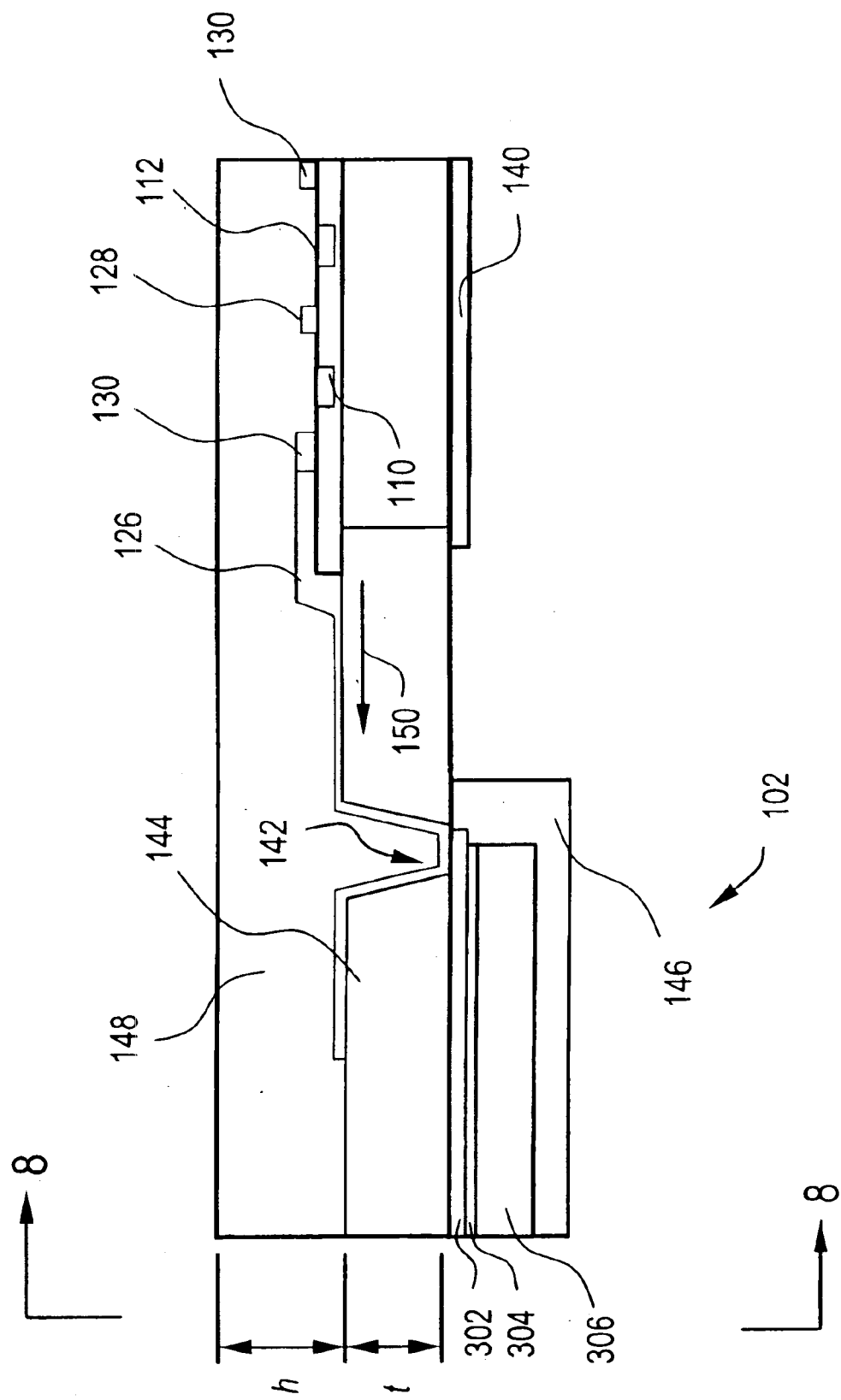
FIG. 7 is a sectional side view of the integrated optoelectronic circuit of FIGS. 4 and 5 including a flexible interelectrode dielectric substrate and showing electrical interconnections for the ground signal return between the MMIC and the MZI.
Figure 8:
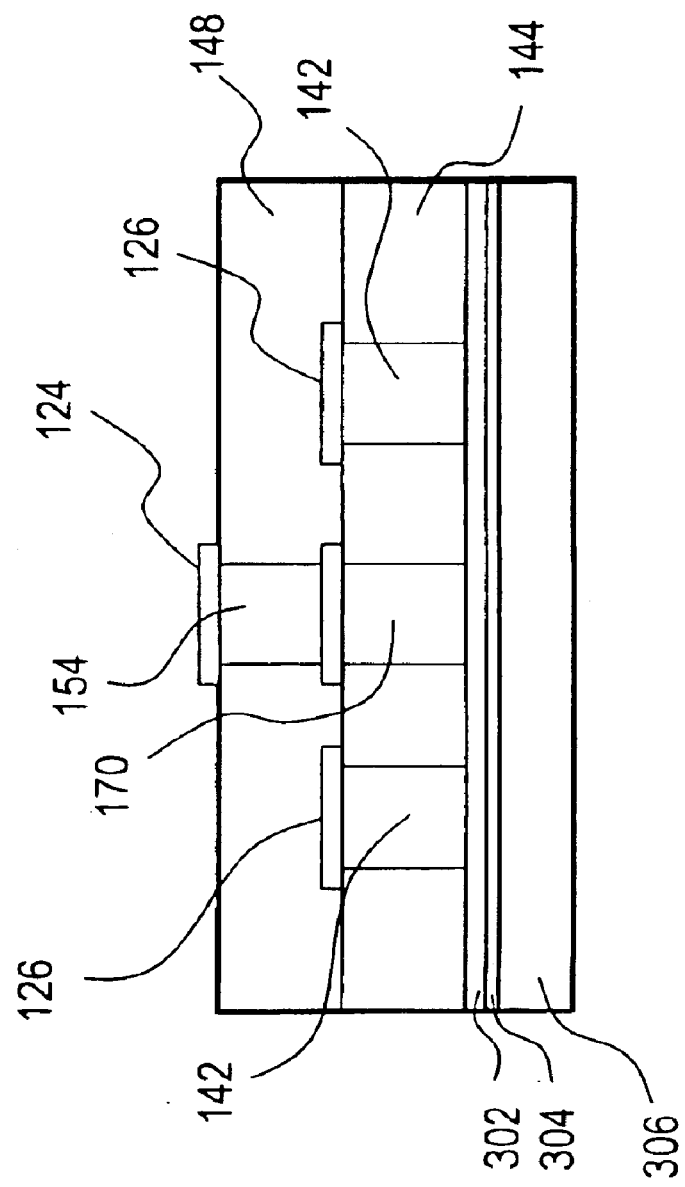
FIG. 8 is a sectional end view of the integrated optoelectronic circuit of FIGS. 6 and 7.
Figure 9:
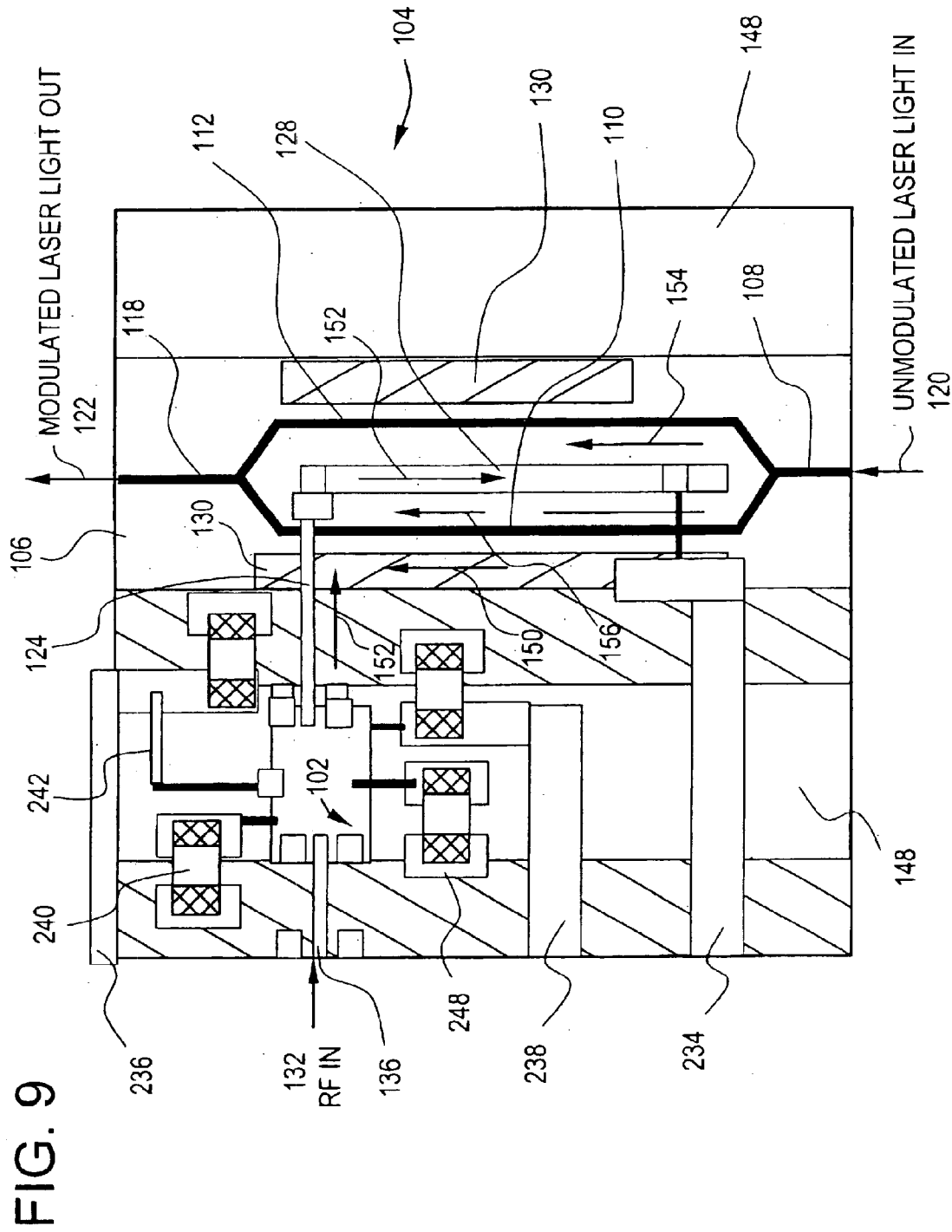
FIG. 9 is a plan view of the integrated optoelectronic circuit of FIGS. 6 and 7.

FIG. 9 is a plan view providing greater detail of the integrated optoelectronic circuit of FIGS. 6 and 7. The DC bias network 234, which controls the static phase offset for the MZI 104, is also fabricated directly onto the flexible dielectric substrate assembly 144, 148. Passive components such as resistors, capacitors and inductors 240, for the amplifier MMIC 102 and the MZI 104 are mounted directly onto the second flexible dielectric substrate 148. A bias tee structure 242 providing power to the MMIC 102, is fabricated directly into metallization on the second flexible dielectric substrate 148. The bias tee 242 comprises integrated passive inductors and resistances fabricated directly into metallization on the second flexible dielectric substrate 148. The geometries of the passive resistors, capacitors and inductors, and the layout thereof, are also based on mathematical modeling, computer simulation and empirical data for the fabrication process. The assembled flexible dielectric substrate module 144, 148 can then be packaged further or combined with other devices in a multi-unit module.

Figure 10A:
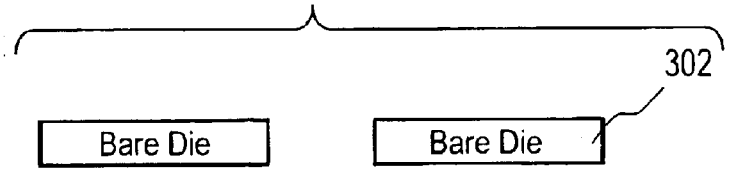
FIGS. 10A through 10E comprise a diagram of a method of fabricating a MMIC die for use in the optoelectronic circuit of FIGS. 4–8.
Figure 10B:
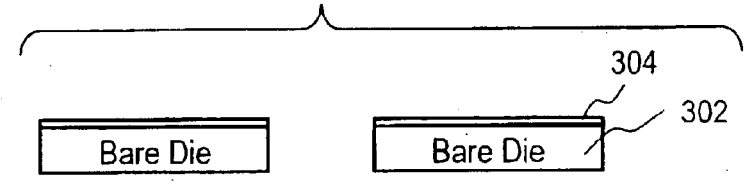
Figure 10C:
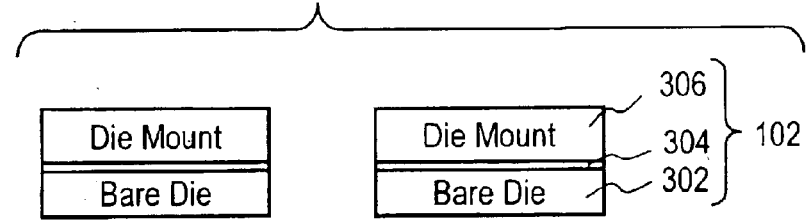
Figure 10D:
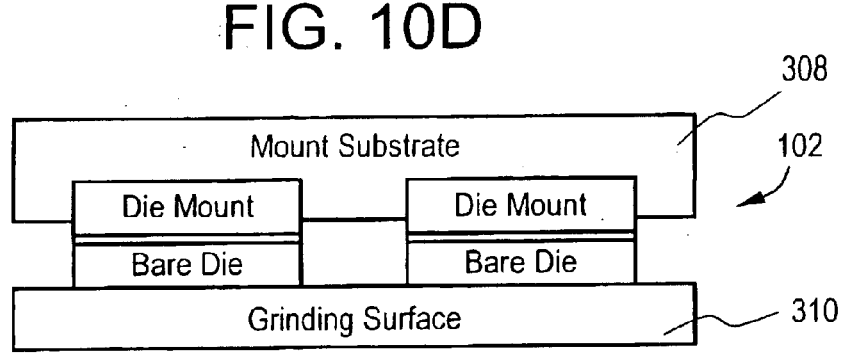
Figure 10E:
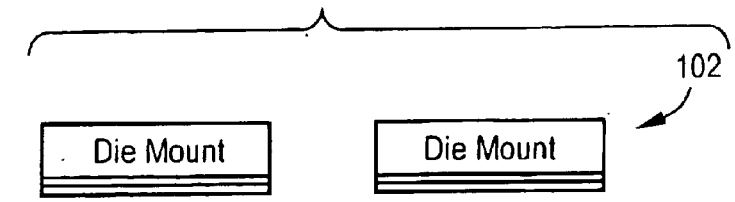

FIGS. 10A–10E depict additional details on the preparation of the MMIC amplifier 102 for integration with the MZI 104. In FIG. 10B, an adhesive 304 is applied to a bare die 302 of FIG. 10A. In FIG. 10C, a die mount 306 is attached to the bare die 302 via the adhesive 304. In FIG. 10D, the die is mounted to a fixture 308 and ground to a thickness as needed. In FIG. 10E, the die assembly 102 is prepared for mounting to the flexible dielectric substrate 144.

Figure 11A:
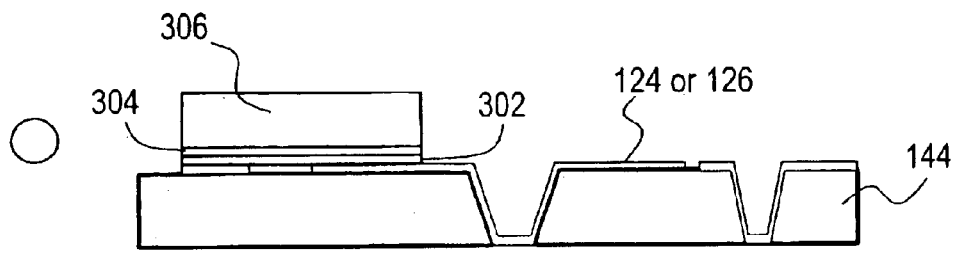
FIGS. 11A through 11D comprise a diagram of a method of fabrication of the optoelectronic circuit of FIGS. 4–8.
Figure 11B:
Figure 11C:
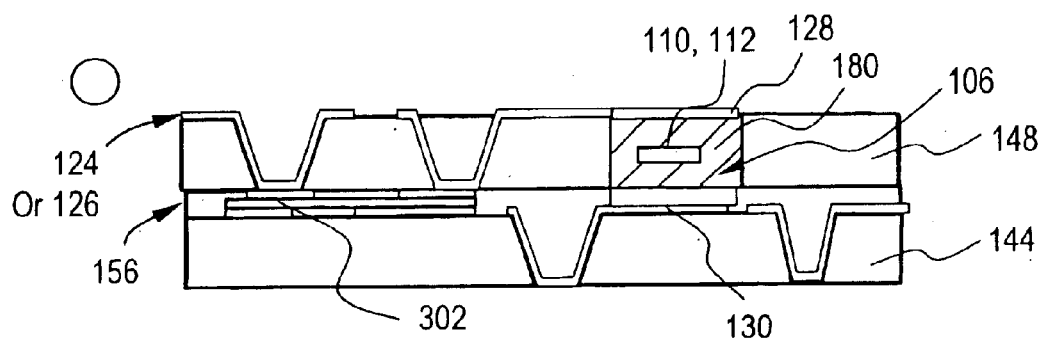
Figure 11D:
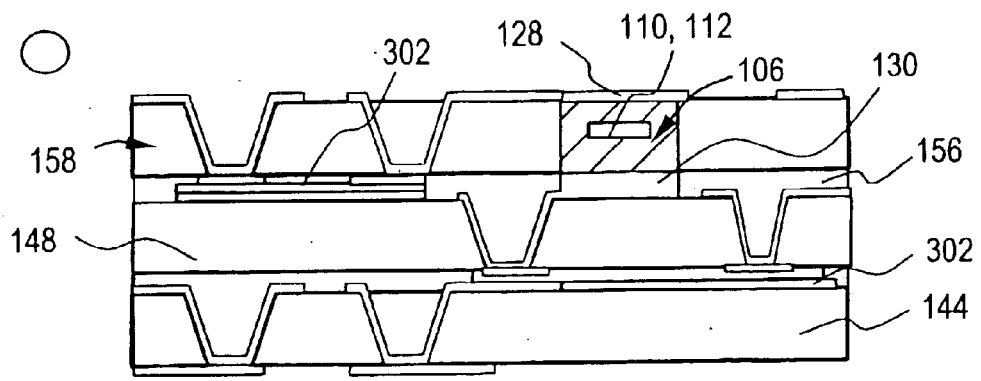

A second optoelectronic circuit for modulating an optical signal is depicted in cross section in FIGS. 11A through 11D. In FIG. 11A, microstrip waveguides 124 are applied to a first flexible dielectric substrate 144. A MMIC 102 is mounted to the first flexible dielectric substrate 144 and electrical connections made to the microstrip waveguides 126. In FIG. 11B, bonding layer 304 and die mount 306 are removed. Metallization is added for grounds and backside connections. In FIG. 11C, a second flexible substrate 148, which acts as a signal layer in the optoelectronic circuit 100, is laminated (e.g., adhesively bonded at 156) over the first flexible dielectric substrate 144. The polymer based MZI 104 is positioned within cavity 180 and RF 128 and ground 130 connections are made thereto. For a single MMIC drive device 102, connections are made from MMIC to MZI using tuned transmission lines 124, 126. For a dual drive optoelectronic circuit, where the two arms 110, 112 of the MZI 104 are driven in a push-pull arrangement, a third layer 158 of flexible dielectric substrate is added (FIG. 11D). All of the key advantages of the preferred embodiment would apply. This approach may have advantages in terms of ease of fabrication, and reduced size of the final component. Also, this embodiment may be more compatible with other device construction techniques already in use, and therefore provide for a higher level of integration.

Figure 12:
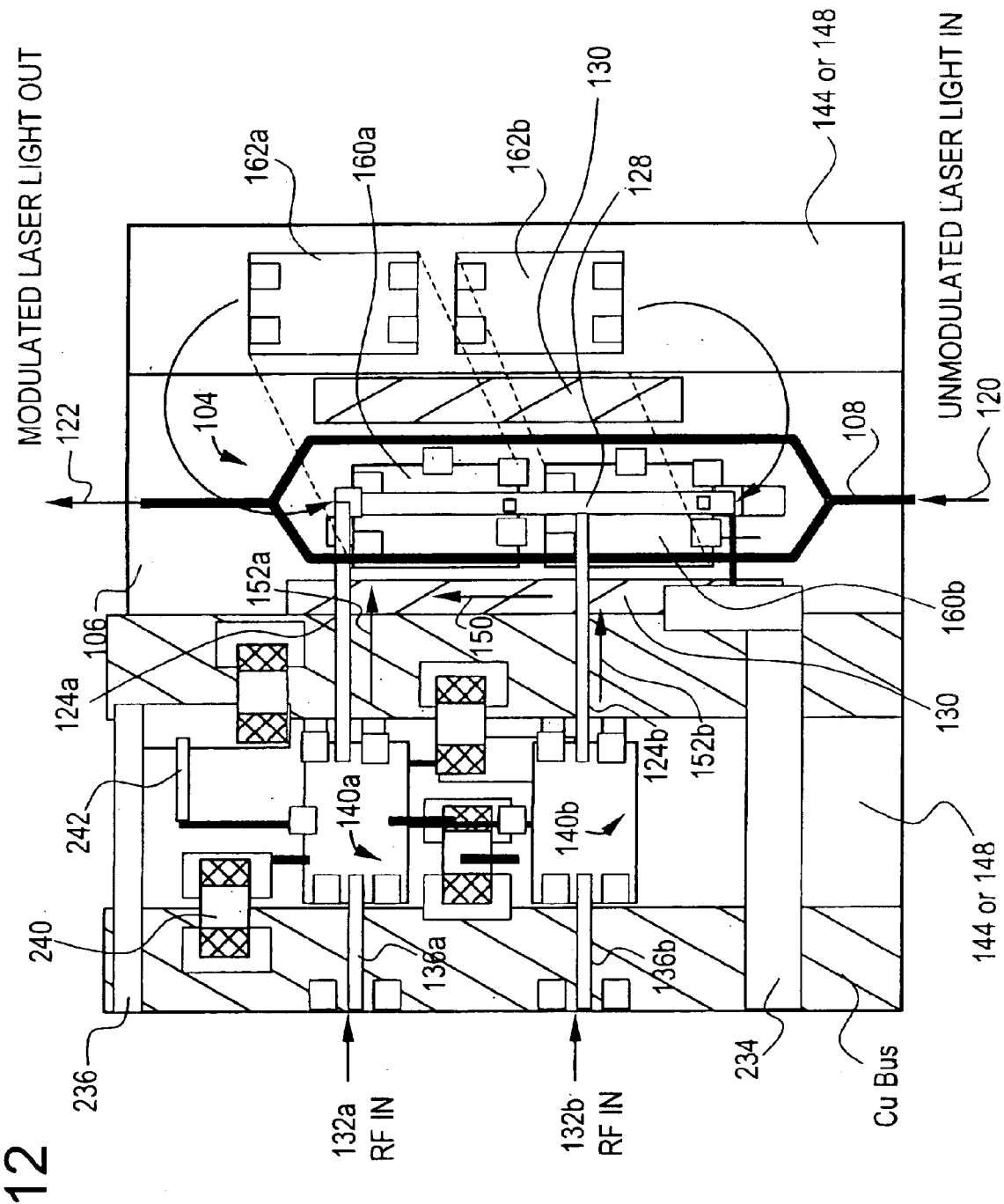
FIG. 12 is a plan view of a second embodiment of the integrated optoelectronic circuit of FIGS. 6 and 7.

Referring to FIG. 12, a plan view of a dual drive optoelectronic circuit is shown. The dual drive optoelectronic circuit comprises a pair of preamplifiers 140a, 140b, each receptive of an RF modulating signal 132a, 132b over transmission line 136a, 136b. The preamplifiers 140a, 140b amplify the RF modulating signals 132a, 132b. The amplified RF modulating signal 152a, 152b are alternately (in a fashion similar to time division multiplexing) guided along microstrip transmission lines 124a, 124b to a tandem pair of traveling wave amplifiers 160a, 160b, 162a, 162b. The traveling wave amplifiers 160a, 160b, 162a, 162b are positioned on opposing sides of the RF electrode 128 for modulating the optical signals 154, 156 in the polymer based MZI 104. Traveling wave amplifiers 162a, 162b are in a flip chip configuration, e.g., the direct electrical connection of facedown electronic components onto flexible dielectric substrates by means of conductive bumps on bond pads.

Figure 13A:
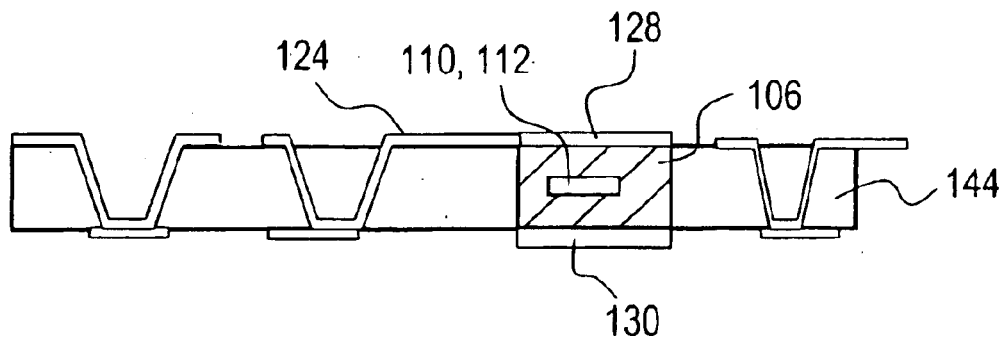
FIGS. 13A through 13E comprising a diagram of a method of fabrication of the integrated optoelectronic circuit of FIG. 12.
Figure 13B:
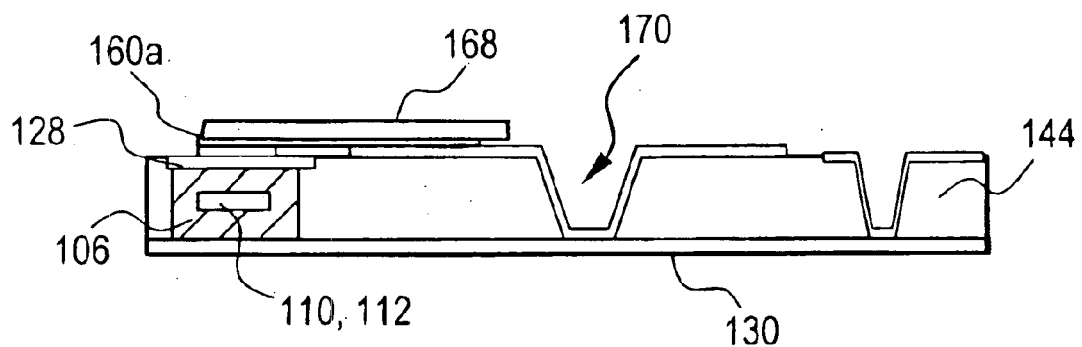

A third optoelectronic circuit for modulating an optical signal is depicted in cross section in FIGS. 13A through 13E. In FIG. 13A, microstrip waveguides 124 are applied to flexible dielectric substrate 144 in which is embedded a polymer based MZI 104 (only one branch of which is shown at 110, 112, 106). RF electrode 128 and ground electrode 130 are positioned on opposing sides of the MZI branch. In FIG. 13B, traveling wave amplifier 160a, fixed to the die mount 168, is connected to the RF electrode 128 and the appropriate via connection 170. Also in FIG. 13C, the die mount 168 and adhesive layer (not shown) are removed.

Figure 13C:
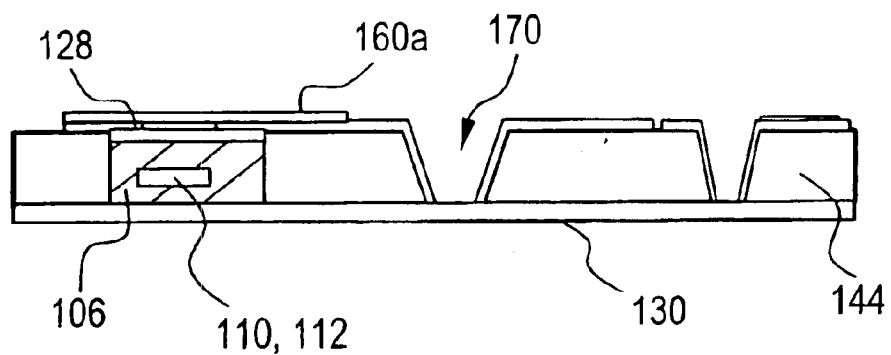
Figure 13D:
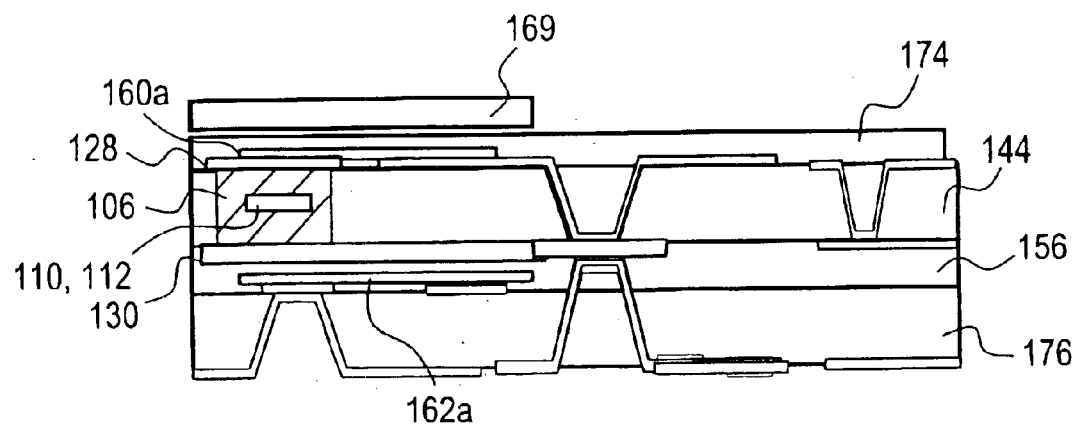

In FIG. 13D, the assembly of FIGS. 13A–13C is adhesively joined with a second flexible dielectric substrate 176. The second flexible dielectric substrate 176 includes traveling wave amplifier 162a fabricated therein whereby traveling wave amplifiers 160a, 162a are positioned on opposing sides of the MZI. In FIG. 13D, the assembly of FIGS. 13A–13C is also encapsulated with an encapsulating material 174 and brought into contact with a heat exchanger 168 for cooling the 160a. Continuing in FIG. 13D, a second flexible dielectric substrate 174, including traveling wave amplifier 162a, is adhesively bonded to flexible dielectric substrate 144, thus providing the arrangement of FIG. 12.

Figure 13E:
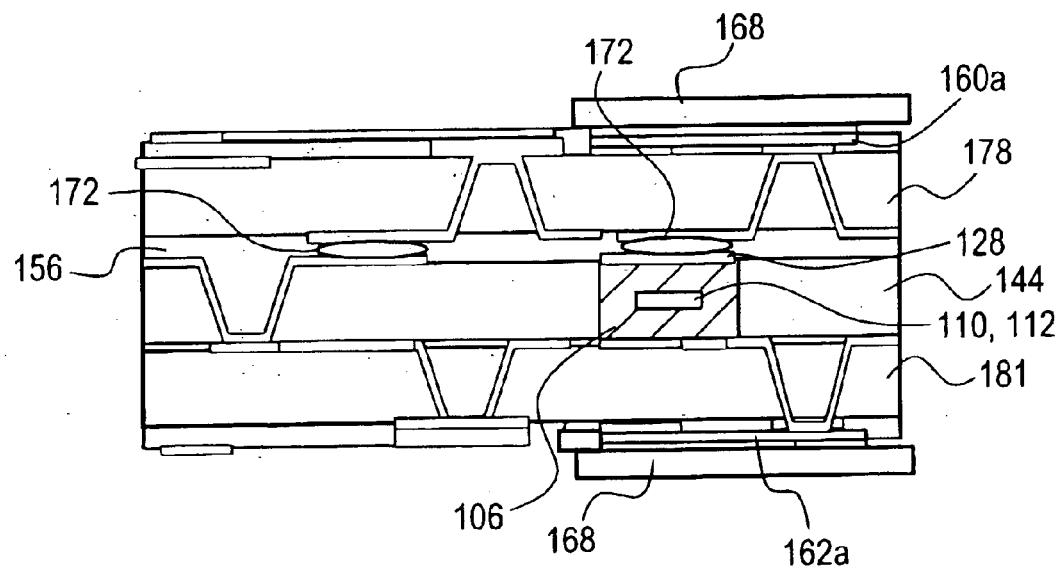

In FIG. 13E, a second embodiment of the arrangement of traveling wave amplifiers 160a, 162a is shown in cross section. Flexible dielectric substrate 144, containing the MZI 104, is adhesively joined with a flexible dielectric substrate 178 containing traveling wave amplifier 160a and brought into communication with heat exchanger 168. RF electrode 128 of the MZI 104 in flexible dielectric substrate 144 is electrically connected to traveling wave amplifier 160a by way of bump mount 172. Also in FIG. 13E, flexible dielectric substrate 180, having traveling wave amplifier 162a positioned thereon, is adhesively joined to the flexible dielectric substrate 144. Traveling wave amplifier 162a positioned on flexible dielectric substrate 178 and is connected to the MZI 104.

Any reference to first, second, etc., or front or back, right or left, top or bottom, upper or lower, horizontal or vertical, or any other phrase indicating the relative position of one object, quantity or variable with respect to another is, unless noted otherwise, intended for the convenience of description, and does not limit the present invention or its components to any one positional, spatial or temporal orientation. All dimensions of the components in the attached Figures can vary with a potential design and the intended use of an embodiment without departing from the scope of the invention.

While the invention has been described with reference to several embodiments thereof, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method of fabricating an integrated optoelectronic circuit, the method comprising:

positioning a microchip, including a modulator, on a first flexible dielectric substrate;

positioning a polymer electro-optic waveguide on or within the first flexible dielectric substrate;

positioning a ground electrode along the electro-optic waveguide;

positioning a signal electrode along the electro-optic waveguide opposite the ground electrode;

applying a first patterned metallization layer to the first flexible dielectric substrate thereby coupling the ground electrode and the modulator;

positioning a second flexible dielectric substrate along the first flexible dielectric substrate;

providing a plurality of via openings in the first and second flexible dielectric substrates; and applying a second patterned metallization layer to the second flexible dielectric substrate thereby coupling the signal electrode and the modulator.

2. The method as set forth in claim 1 further comprising providing a heat exchanger in thermal contact with the microchip for cooling the modulator.

3. The method as set forth in claim 1 further comprising encapsulating the microchip in a microwave absorber.

4. The method as set forth in claim 1 further comprising poling the polymer electro-optic waveguide.

5. The method as set forth in claim 1 wherein the first and second patterned metallization layers and the signal electrode comprise microstrip transmission lines.

6. The method as set forth in claim 1 wherein the first and second dielectric substrates comprise a polyamide polymer.

7. The method as set forth in claim 1 wherein the electro-optic waveguide comprises a Mach-Zehnder interferometer.

8. The method as set forth in claim 1 wherein the modulator comprises a monolithic microwave integrated circuit.

9. The method as set forth in claim 1 wherein the electro-optic waveguide is positioned on the first surface of the first flexible dielectric substrate and the microchip is position of the second surface of the first flexible dielectric substrate.

10. The method as set forth in claim 1 wherein the electro-optic waveguide is positioned between the first and second flexible dielectric substrates.

11. The method as set forth in claim 1 wherein the polymer electro-optic waveguide comprises a poly(acrylate), a poly(alkyl methacrylate), a poly(tetrafluoroethylene), a silicone or mixtures thereof, wherein the alkyl groups have one to about twelve carbon atoms.

12. The method as set forth in claim 11 wherein the poly(alkyl methacrylate) comprises poly(methyl methacrylate).

* * * * *

UNITED STATES PATENT AND TRADEMARK OFFICE
CERTIFICATE OF CORRECTION

PATENT NO. : 6,818,466 B2
DATED : November 16, 2004
INVENTOR(S) : William Kornumpf et al.

It is certified that error appears in the above-identified patent and that said Letters Patent is hereby corrected as shown below:

<u>Title page,</u>
Item [56], References Cited, U.S. PATENT DOCUMENTS, insert
-- 5,562,838    9/1994    Wojnarowski et al. --

Signed and Sealed this

Twenty-sixth Day of April, 2005

JON W. DUDAS
*Director of the United States Patent and Trademark Office*